July 30, 1957 W. V. GOODHUE 2,800,792
DYNAMOMETER
Filed March 24, 1954

INVENTOR.
WILLIAM V. GOODHUE
BY
ATTORNEY

United States Patent Office 2,800,792
Patented July 30, 1957

2,800,792
DYNAMOMETER

William V. Goodhue, North Kingstown, R. I., assignor to Universal Winding Company, Cranston, R. I., a corporation of Massachusetts Application March 24, 1954, Serial No. 418,250

3 Claims. (Cl. 73—135)

The present invention relates to a force measuring instrument and more particularly pertains to a dynamometer.

One object of the present invention is to provide a device capable of accurately and rapidly measuring torque.

Another object of the present invention is to provide an apparatus capable of applying known torque loads.

Another object of the present invention is to provide an apparatus capable of applying known tension loads to flexible material.

Another object of the present invention is to provide a dynamometer incorporating a braking member wherein friction variations will have a negligible effect upon the load applying characteristics of the apparatus.

Another object of the present invention is to provide a torque limiting device incorporating a novel brake member.

Another object of the present invention is to provide a dynamometer that is simple and reliable in operation and which can be inexpensively manufactured.

Other objects of the invention will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention reference should be had to the following detailed description taken in connection with the accompanying drawing wherein.

Figure 1:
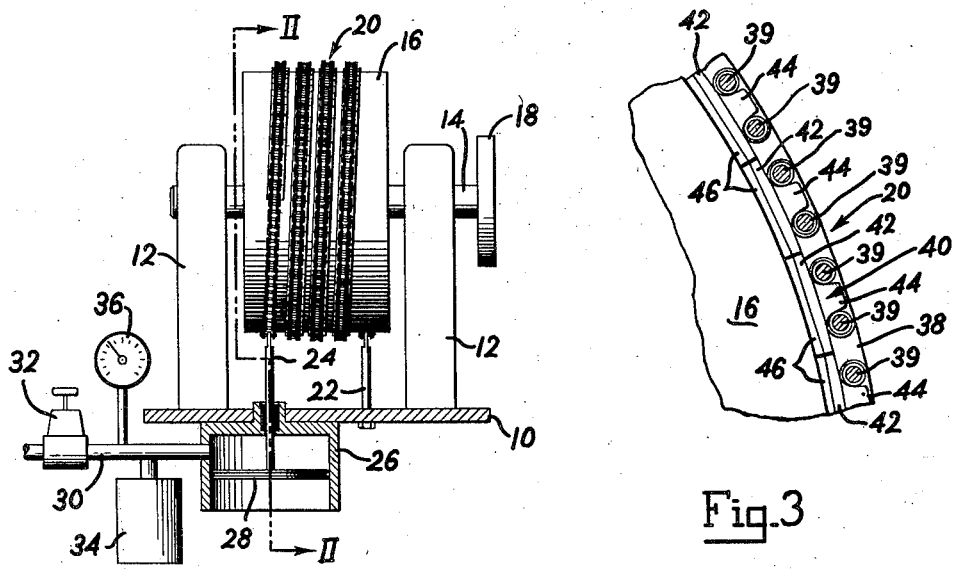
Fig. 1 is a side elevation of a preferred embodiment of the present invention.
Figure 3:
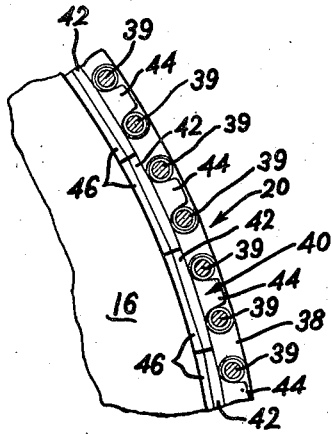
Fig. 3 is a fragmentary view to an enlarged scale, with parts broken away, showing details of the braking member.

The present invention comprises a rotatable cylindrical braking surface fitted with a wrap around friction applying brake member. Pneumatic means are provided for applying tension to the braking member including a gage that preferably is calibrated to give a direct reading of the force necessary to rotate the cylindrical braking surface for any predetermined pneumatic load applied to the braking member.

The apparatus comprises a base plate 10 that can be supported in any convenient manner. A pair of spaced uprights 12 are fixed to base 10 and are provided with aligned bearings adjacent their upper ends. A horizontal shaft 14 is rotatably journaled in the bearings carried by uprights 12 and carries a cylindrical brake drum 16 fixedly secured thereto between said uprights. One end of shaft 14 extends beyond its associated upright 12 and has a face plate 18 fixedly secured thereto to provide a coupling by means of which the dynamometer can be connected to any rotating or rotatable element.

A flexible friction applying member 20 is wrapped around brake drum 16 and has one of its ends secured to base plate 10 by means of stud 22 anchored thereto. The other end of friction applying member 20 is secured to the end of piston rod 24. Piston rod 24 passes through the end wall 25 of pneumatic cylinder 26 and is fixedly secured to piston 28 slidably received therein.

An air line 30 connects cylinder 26 to a source of compressed air for actuating piston 28. A pressure regulating valve 32, which may be of any convenient type well known to those skilled in the art, is fitted in air line 30 so that the air pressure admitted to cylinder 26 to act on piston 28 can be regulated to any predetermined desired pressure. Air line 30 is also connected to a reservoir or tank 34 between valve 32 and cylinder 26 to provide a large volume of air under pressure to thereby minimize pressure fluctuations due to small movement of piston 28 by friction member 20. A pressure gage 36 is connected to air line 30 between valve 32 and cylinder 26 to record the pressure of the air acting on the surface of piston 28. Preferably gage 36 is calibrated to give as a direct reading the torque load the pressure is imposing upon shaft 14. However, it will be understood that said gage can be a conventional pressure gage and the torque load calculated by resolving the pressure applied to piston 28 into the pull exerted on brake 20 and employing the formula given hereinafter, or by using a chart that would convert pounds per square inch pressure to torque.

The flexible friction applying member 20 acts as a brake to impose a load or resistance to turning on shaft 14, and it is preferred that said brake be wrapped around drum 16 a plurality of times. As will become more apparent hereinafter the sensitivity of the device increases as the number of brake wraps increases. Also the error introduced by changes in the coefficient of friction decreases the number of wraps increases. Obviously there are practical limitations to the number of wraps that can be used and it has been found that 3½ wraps around drum 16 is a satisfactory arrangement under certain conditions. It will be appreciated that a greater number of wraps can be advantageously employed in many instances, or a fewer number of wraps can be used if maximum sensitivity and accuracy is not essential. Flexible friction applying or brake member 20 preferably comprises a plurality of articulated brake blocks consisting of a length of sprocket chain 38 holding a plurality of friction blocks 40 against the surface of brake drum 16. Friction blocks 40 are each comprised of a generally rectangular base portion 42 having a rectangular stem 44 normal to and projecting from substantially the mid-point of one face thereof to between and into engagement with adjacent cross links 39 of chain 38. The opposite face of said base portion 42 has bonded thereto a block of friction material 46 having an area substantially equal to the area of said base portion. Friction material 46 can be any convenient material as for example wood or fibre but preferably it is a porous sintered material such as sintered brass or bronze that is brazed to the face of base portion 42. The brake drum engaging surface of friction material 46 is curved to conform to the curvature of said brake drum so that the entire surface thereof is in contact with said drum surface.

Piston rod 24 is slidably journaled in the end wall 25 of pneumatic cylinder 26 by means of anti-friction bearing 48 which can be any of the well known types of longitudinal anti-friction bearings. Piston 28 preferably fits quite loosely in cylinder 26, that is to say the diameter of said piston is smaller than the diameter of the bore of cylinder 26 to provide an annular space 50 around said piston between the wall of cylinder 26 and piston 28 to thereby eliminate any friction between said piston and cylinder and to provide a space through which air admitted to said cylinder can escape thereby providing for a constant supply of air being fed into said cylinder. The edge of piston 28 is provided with an annular groove 52 that assists in maintaining said piston centrally located in the cylinder bore. In the event the piston is displaced laterally into contact with the cylinder wall annular groove 52 permits air to pass therethrough to tend to move the piston away from the wall back to its desired central location.

If it is desried to cool brake drum 16, said drum can be made hollow and shaft 14 can be provided with a bore for conducting a coolant into and out of said drum.

Figure 2:
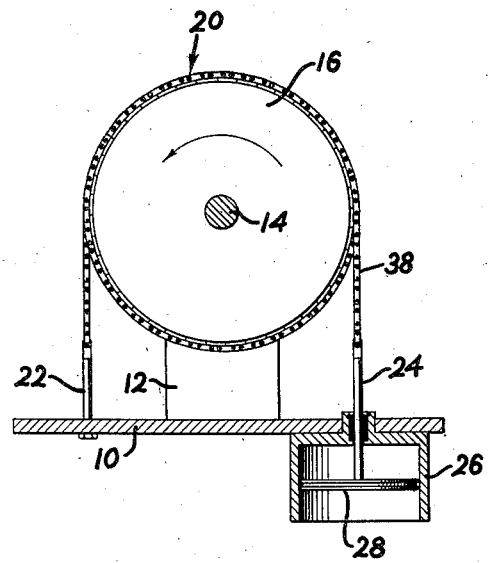
Fig. 2 is a sectional view taken on the line II—II of Fig. 1.
Figure 4:
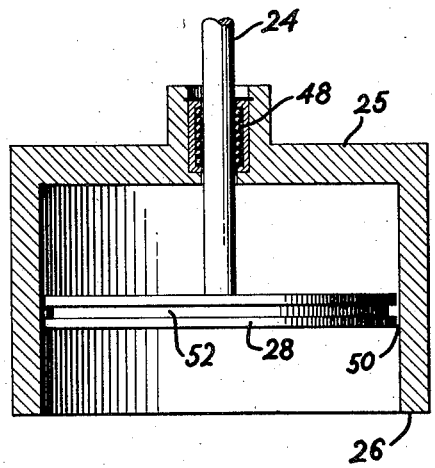
Fig. 4 is an enlarged sectional view showing details of the air cylinder.

The above described apparatus functions in the following manner. A rotating force, which may be a motor, a drum having a strand of material wrapped therearound and being pulled to rotate said drum, a capstan having a running strand wrapped therearound, etc., is connected to shaft 14 by means of face plate 18 in such a manner that said force will rotate brake drum 16 in the direction indicated by the arrow in Fig. 2. That is to say, brake drum 16 must be rotated in the direction to exert a pull on piston rod 24. Pressure regulating valve 32 is opened to increase the air pressure acting on the surface of piston 28 to thereby increase the tension on brake member 20 and to thereby increase the resistance to the rotation of brake drum 16. Inasmuch as gage 36 is calibrated to read directly in terms of the torque required to rotate brake drum 16 for any given pressure, the torque of the force applied to face plate 18 can be read directly from said gage when sufficient air pressure is acting on the face of piston 28 to stop the rotation of said drum. The apparatus can also be used to apply a predetermined load to the rotating device so that its performance under known load conditions can be observed.

The above described structure can also be employed to impart a predetermined tension to a strand of filamentary material. When it is desired to use the present invention in such a manner a drum or capstan will be secured to face plate 18 in axial alignment with shaft 14 and the strand of filamentary material wrapped around said drum a sufficient number of times to insure that it will not slip. Tension is then applied to the free end of the filamentary material to apply a turning moment to the drum. When the tension in the strand reaches a value where the turning moment resulting therefrom is equal to the braking force being applied by brake member 20 as the result of a preset air pressure, brake drum 16 will start to rotate and will continue to be rotated by said strand to thereby prevent the tension in the filamentary material from exceeding that value necessary to rotate the drum.

Due to the novel arrangement of parts in the present invention, the starting friction between drum 16 and brake member 20 is substantially the same as the running friction therebetween. Also, friction variations between the surface of brake drum 16 and brake member 20, such as may be caused by temperature changes, staring versus running friction, oil on the drum or friction surfaces etc., have a negligible effect on the effective braking action of member 20. This can be explained by the formula:

torque required to rotate drum 16 =
$$T_1 \times R - T_2 \times R = R(T_1 - T_2)$$

where R is the radius of drum 16

$T_1$ is the pull on brake member 20 from piston 28
$T_2$ is the pull between brake member 20 and base 10.
And $$T_2 = \frac{T_1}{e^{fr}}$$

Where $e = 2.178$ (base of natural logarithm)
$f =$ coefficient of friction
$r =$ wrap of brake member 20 around drum 16 in radians.

Inasmuch as it is preferred to have brake 20 make at least three and one-half wraps around brake drum 16, it will be seen that the change in $(T_1 - T_2)$ is negligible for a wide range of change in the coefficient of friction inasmuch as $T_1$ is always a large value as compared to the value of $T_2$. This may be illustrated by substituting $\frac{T_1}{e^{fr}}$ for $T_2$ to give torque $= R\left(T_1 - \frac{T_1}{e^{fr}}\right)$ With three and one-half wraps of brake 20, $r$ is equal to $7\pi$ or 21.9912 radians. Obviously a large change in the coefficient of friction between the surface of brake 16 and friction pads 46 as, for example, a change from .4 to .5 or .3 will effect a very minor change in the torque required to rotate drum 16.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A device for applying a predetermined torque load comprising a rotatable brake drum, means for connecting a rotating force to said drum, a brake band encircling said drum, means holding one end of said brake band, a cylinder, a piston loosely fitted in said cylinder to provide an annular space therebetween and connected to the other end of said brake band, a reservoir for holding fluid under pressure, means for continuously applying a fluid pressure to said piston and said reservoir for exerting a predetermined pull on said brake band to thereby apply a predetermined braking force to said drum, and indicating means actuated by said fluid pressure for indicating the torque necessary to rotate said brake drum, said reservoir acting to minimize fluctuations in said fluid pressure caused by sudden movement of said piston, said annular space providing a passageway through which fluid admitted to said cylinder can escape.

2. A device for applying a predetermined torque load comprising a rotatable brake drum, means for connecting a rotating force to said drum, a brake band encircling said drum, means holding one end of said brake band, a cylinder, a piston loosely fitted in said cylinder to provide an annular space therebetween and connected to the other end of said brake band, a reservoir for holding fluid under pressure, means including a pressure regulating valve for continuously applying a fluid pressure to said piston and said reservoir for exerting a predetermined pull on said brake band to thereby apply a predetermined braking force to said drum, and indicating means actuated by said fluid pressure for indicating the torque necessary to rotate said brake drum, said reservoir acting to minimize fluctuations in said fluid pressure caused by sudden movement of said piston, said annular space providing a passageway through which fluid admitted to said cylinder escape.

3. A device for applying a predetermined torque load as set forth in claim 1 wherein said piston has an annular groove formed in its edge.

References Cited in the file of this patent

UNITED STATES PATENTS

| 1,621,354 | Dawley | Mar. 15, 1927 |
|---|---|---|
| 1,711,886 | Ginter | May 7, 1929 |
| 1,777,423 | Zeder | Oct. 7, 1930 |
| 1,912,520 | Gargolinski | June 6, 1933 |
| 2,012,110 | Shroyer | Aug. 20, 1935 |
| 2,128,265 | Pechy | Aug. 30, 1938 |
| 2,365,443 | Angst | Dec. 19, 1944 |
| 2,526,303 | Turner | Oct. 17, 1950 |
| 2,581,239 | Clark | Jan. 1, 1952 |

FOREIGN PATENTS

| 386,172 | Germany | Dec. 4, 1923 |
|---|---|---|
| 453,185 | Germany | Dec. 1, 1927 |